(12) United States Patent
Kirner et al.

(10) Patent No.: US 11,652,637 B2
(45) Date of Patent: *May 16, 2023

(54) ENFORCING A SEGMENTATION POLICY USING CRYPTOGRAPHIC PROOF OF IDENTITY

(71) Applicant: Illumio, Inc., Sunnyvale, CA (US)

(72) Inventors: Paul J. Kirner, Palo Alto, CA (US); Matthew K. Glenn, Mountain View, CA (US); Mukesh Gupta, Fremont, CA (US); Anish Vinodkumar Desai, Palo Alto, CA (US)

(73) Assignee: Illumio, Inc., Sunnyvale, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/398,814

(22) Filed: Aug. 10, 2021

(65) Prior Publication Data

US 2022/0103361 A1  Mar. 31, 2022

Related U.S. Application Data

(63) Continuation of application No. 15/789,921, filed on Oct. 20, 2017, now Pat. No. 11,121,875.

(51) Int. Cl.
*H04L 29/06* (2006.01)
*H04L 9/32* (2006.01)
*H04L 9/40* (2022.01)

(52) U.S. Cl.
CPC .......... *H04L 9/3226* (2013.01); *H04L 9/3242* (2013.01); *H04L 9/3247* (2013.01);
(Continued)

(58) Field of Classification Search
CPC ... H04L 9/3226; H04L 9/3242; H04L 9/3247; H04L 9/3268; H04L 63/02; H04L 63/06;
(Continued)

(56) References Cited

U.S. PATENT DOCUMENTS 9,830,111 B1 * 11/2017 Patiejunas ............ G06F 3/0625
2010/0024036 A1 * 1/2010 Morozov ................ G06F 21/74
726/26

(Continued)

OTHER PUBLICATIONS

United States Office Action, U.S. Appl. No. 15/789,921, dated Jan. 25, 2021, 17 pages.
(Continued)

*Primary Examiner* — Harunur Rashid
(74) *Attorney, Agent, or Firm* — Fenwick & West LLP

(57) ABSTRACT

A segmentation server defines a segmentation policy and distributes the segmentation policy to be enforced by a plurality of operating system (OS) instances. The segmentation policy includes rules controlling which workloads executing on the OS instances can communicate with other workloads and controlling how the workloads may communicate. When a connection between two OS instances is requested, each OS instance provides an identity and a cryptographic proof of the identity. The OS instances each authenticate the identity received from the other OS instance, and once authenticated, determines based on the authenticated identities if the rules permit the communication. If the rules permit the communication, the OS instances obtain session parameters that enable the OS instances to validate integrity of the messages communicated between the workloads and optionally encrypt the messages.

17 Claims, 5 Drawing Sheets

(52) U.S. Cl.
 CPC ............ *H04L 9/3268* (2013.01); *H04L 63/02* (2013.01); *H04L 63/06* (2013.01); *H04L 63/0823* (2013.01); *H04L 63/0869* (2013.01); *H04L 63/20* (2013.01)

(58) Field of Classification Search
 CPC .. H04L 63/0823; H04L 63/0869; H04L 63/20
 See application file for complete search history.

(56) References Cited

U.S. PATENT DOCUMENTS

2010/0115101 A1\* 5/2010 Lain ...................... H04L 63/102
 709/227
2010/0306816 A1\* 12/2010 McGrew ................ H04L 63/08
 726/1
2016/0350534 A1\* 12/2016 Poornachandran ... H04L 9/3273

OTHER PUBLICATIONS

United States Office Action, U.S. Appl. No. 15/789,921, dated Apr. 15, 2020, 12 pages.

\* cited by examiner

ENFORCING A SEGMENTATION POLICY USING CRYPTOGRAPHIC PROOF OF IDENTITY

CROSS REFERENCE TO RELATED APPLICATIONS

This application is a continuation of U.S. patent application Ser. No. 15/789,921, filed Oct. 20, 2017, now U.S. Pat. No. 11,121,875, which is incorporated by reference.

BACKGROUND

This application relates generally to managing communications between operating system instances on a network, and more specifically to enforcing a segmentation policy.

A segmentation policy controls which entities may communicate on a network and may replace restrictions on how such entities may communicate. The segmentation policy includes rules that describe permitted communications among the machines on the network. A segmentation policy may be defined as a high-level policy that specifies the rules at a high level of abstraction that does not necessarily expressly identify specific machines to which the rules apply. The high-level policy may be translated into a low-level policy that specifies the rules at a lower level of abstraction and identifies the specific machines to which the rules apply. Conventionally, a low-level policy identifies machines using IP addresses. Hence, a rule of the low-level policy may describe communications permitted between two machines identified by the machines' respective IP addresses.

However, IP addresses are not always a trustworthy machine identifier. If certain infrastructure controls are not in place in specific environments, malicious actor can spoof IP addresses and thereby circumvent a policy that relies on IP addresses. Moreover, IP addresses of machines on the network can change for legitimate reasons. For example, laptops and other mobile devices may obtain different IP addresses when they connect and reconnect to the network. These changing IP addresses present an administrative burden in maintaining the segmentation policy and may cause the policy to fail. As a result, low-level policies that rely on IP addresses as machine identifiers have several drawbacks that elevate security risks.

SUMMARY

A method, non-transitory computer-readable storage medium, and computing device enforces a segmentation policy. A first operating system instance executing on a computing device sends a connection request from a first workload executing on the first operating system to a second workload executing on a second operating system instance on a second computing device. The first operating system instance provides to the second operating system instance, a first identity (e.g., a machine identifier for the first operating system instance or a user identifier for a user logged into the first operating system instance) and a first cryptographic proof of the first identity. The first operating system instance receives from the second operating system instance, a second identity (e.g., a machine identifier for the second operating system instance or a user identifier for a user logged into the second operating system instance) and a second cryptographic proof of the second identity. The first operating system instance authenticates the second identity received from the second operating system instance based on the second cryptographic proof of the second identity. Responsive to authenticating the second identity received from the second operating system instance, the first operating system instance determines, based on the second identity, if the second workload executing on the second operating system instance is permitted to communicate with the first workload according to management instructions stored by the first operating system instance. Responsive to determining that the second workload is permitted to communicate with the first workload, the first operating system instance obtains session parameters for communicating between the first workload and the second workload. Messages are then communicated between the first workload and the second workload in accordance with the session parameters.

The features and advantages described in this summary and the following detailed description are not all-inclusive. Many additional features and advantages will be apparent to one of ordinary skill in the art in view of the drawings, specification, and claims hereof.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A segmentation server defines a segmentation policy and distributes the segmentation policy to be enforced by a plurality of operating system (OS) instances. The segmentation policy includes rules controlling which workloads executing on the OS instances can communicate with other workloads and controlling how the workloads may communicate. When a connection between two workloads is requested, each OS instance on which the respective workloads execute authenticates an identity received from the other OS instance by exchanging respective identities and cryptographic proof of the identities. Once authenticated, the OS instances determine, based on the authenticated identities, if the rules permit the communication between the respective workloads. If the rules permit the communication, the OS instances may generate session parameters such as session keys, session identifiers, and data path algorithms to be used in a communication session. During the communication session, the OS instances each perform integrity checks on received messages based on the session identifiers and session keys and optionally encrypt transmitted messages using the session keys. Authenticating the identities of the OS instances before and during enforcement of the segmentation policy provides stronger security than enforcement techniques relying solely on IP addresses because the identities are difficult or impossible to spoof and attacks based on IP address spoofing will fail.

Figure 1:
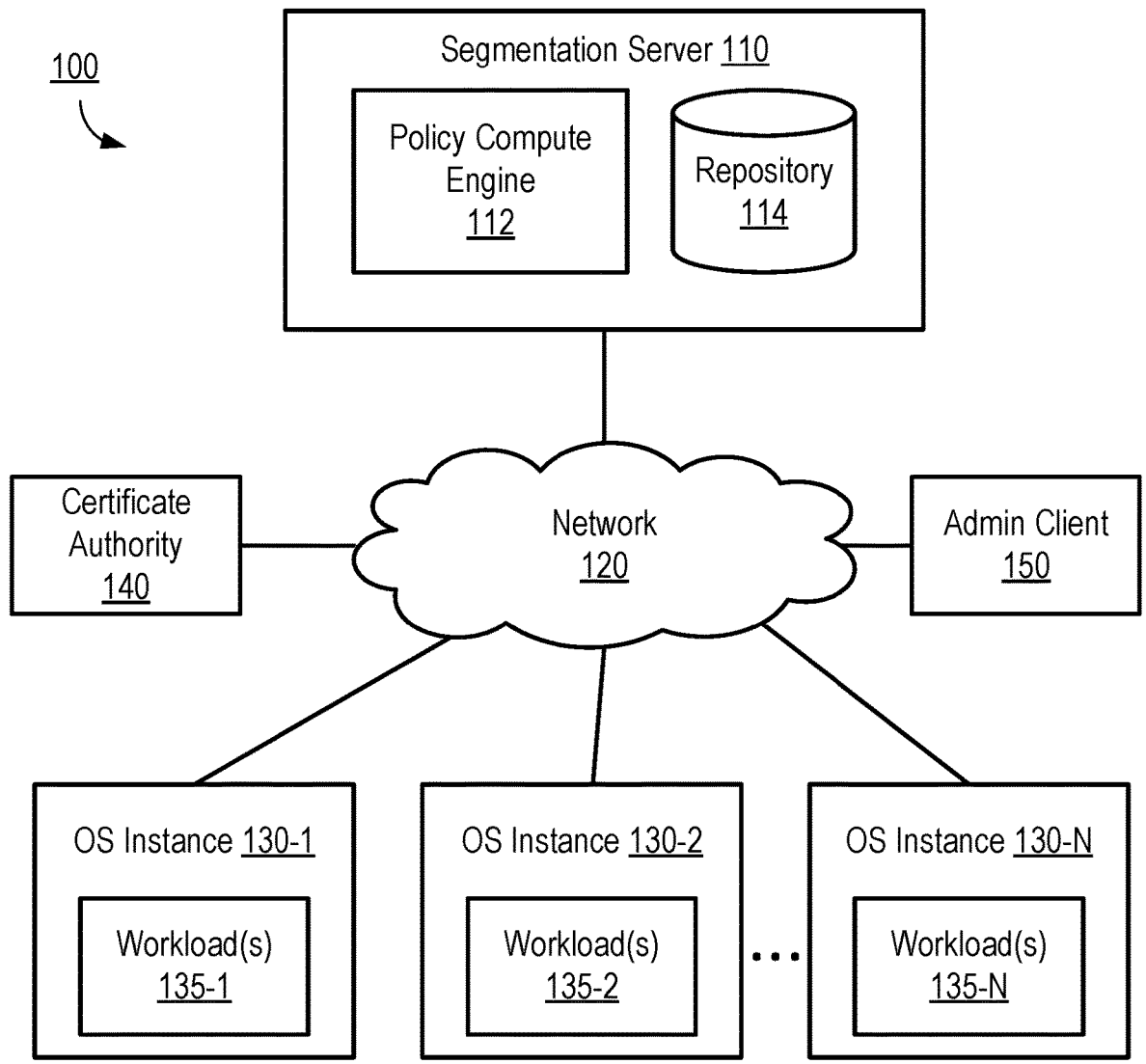
FIG. 1 is a block diagram illustrating an embodiment of a networked computing environment.

FIG. 1 is a high-level block diagram illustrating a networked computing environment 100. The networked computing environment 100 includes a segmentation server 110, a network 120, a certificate authority 140, an administrative client 150, and a plurality of OS instances 130 (e.g., OS instances 130-1, 130-2, . . . , 130-N). The OS instances 130 each execute one or more workloads 135 (e.g., one or more workloads 135-1, one or more workloads 135-2, . . . , one or more workloads 135-N).

The OS instances 130 comprise instances of an operating system executing on one or more computing devices. An OS instance 130 may execute directly on a physical machine or on a virtual machine that executes on one or more computing devices. A single physical or virtual machine may operate a single OS instance 130 or may operate multiple OS instances 130. The workloads 135 comprise independently addressable computing units for performing computing tasks. In some instances, an OS instance 130 may operate only a single workload 135 and thus the identity of the workload 135 may be synonymous with the identity of the OS instance 130. In other instances, an OS instance 130 may operate multiple workloads 135 that may be independently identifiable and addressable. Here, a workload 135 may comprise, for example, a process, a container, or other sub-component executing on the OS instance 130.

The segmentation server 110 comprises a computer or set of computers that obtains and stores information about the OS instances 130 on the network 120 and the workloads 135 executing on the OS instances 130, generates management instructions for managing communications between the workloads 135, and sends the generated management instructions to the respective OS instances 130. In an embodiment, the segmentation server 110 comprises a policy compute engine 112 and a repository 114. In alternative embodiments, the segmentation server 110 may comprise different or additional components. The policy compute engine 112 and other components of the segmentation server 110 may be implemented as a non-transitory computer-readable storage medium storing instructions executable by one or more processors that when executed causes the one or more processors to perform the steps attributed to the policy compute engine 112 described herein.

The policy compute engine 112 generates the management instructions based on an administrative domain state and a segmentation policy that may be received from an administrative client 150. The administrative domain state includes descriptions of the OS instances 130 and their respective workloads 135 on the network 120 being managed by the segmentation server 110, and may optionally also include descriptions of other unmanaged devices on the network 120. The descriptions characterizing the administrative domain state may be stored in the repository 114.

The segmentation policy includes a set of rules specifying whether certain workloads 135 are allowed to provide services to or receive services from other workloads 135, and may place restrictions on how those workloads 135 are allowed to communicate when providing or consuming the services. For example, a segmentation policy may include a rule specifying that a workload 135-1 operating on an OS instance 130-1 is allowed to provide a particular service to a workload 135-2 operating on an OS instance 130-2, but is not allowed to provide the service to a workload 135-N operating on an OS instance 130-N. The rule may furthermore specify the type of service that the workload 135-1 is allowed to provide to workload 135-2 (e.g., a database service, a web service, etc.). Additionally, the rule may specify how the workloads 135-1, 135-2 may communicate when providing this service (e.g., using encrypted communication only, using authenticated communication only, etc.). For example, a rule may be specified as a plurality of fields including a "service," a "provided-by" portion that identifies one or more workloads 135 that is permitted to provide the service, a "used-by" portion that identifies one or more workloads 135 that is permitted to use the service provided by the workloads 135 in the "provided-by portion," and a "rule function" that may place one or more restrictions on the communications between the workloads 135 while facilitating the service.

A single rule may be applicable to multiple workloads 135. In an embodiment, each workload 135 may be assigned one or more labels that define one or more high-level characteristics of the respective workloads 135. Instead of using rules that uniquely reference each workload 135 to which the rule applies, a rule may instead identify a group of workloads 135 by referencing one or more labels. Here, a label may comprise a "dimension" (a high-level characteristic) and a "value" (the value of that high-level characteristic). For example, one possible label dimension may specify a "role" of the workload 135 and may have values such as "web," "API," or "database" specifying the role of the workloads 135 within the administrative domain. In another example, a label dimension may specify a "location" of the workload 135 and may have values such as "United States" or "Europe." Workloads may also be labeled based on a user group of a user that is logged into the workload or the OS instance 130 on which the workload executes. Each workload 135 may be assigned labels for one or more dimensions but each workload 135 does not necessarily have a label assigned for every possible dimension. For example, a workload 135 may have a label specifying its location but may not necessarily have a label specifying its role. The set of labels assigned to a particular workload 135 may be referred to herein as a label set for the workload 135.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the managed server within the administrative domain.<br>V: web, API, database |
| Environment | M: The lifecycle stage of the managed server.<br>V: production, staging, development |
| Application | M: The logical application (higher-level grouping of managed servers) to which the managed server belongs.<br>V: trading, human resources |

TABLE 1-continued

Example of logical management model

| Dimension | Meaning (M), Values (V) |
|---|---|
| Line of Business | M: The business unit to which the managed server belongs.<br>V: marketing, engineering |
| Location | M: The location of the managed server. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the managed server.<br>V: Engineers, Contractors, Managers, System Administrators |

The policy compute engine 112 may generate management instructions from the rules and send the management instructions to the OS instances 130 so that the OS instances 130 may enforce the segmentation policy. The management instructions may include rules controlling communications between different groups of workloads 135 (e.g., specified by their labels or directly by an identifier of the workload 135) and membership information indicating workloads 135 belonging to each group (e.g., which workloads 135 have certain label sets). For efficiency of distribution, the policy compute engine 112 may send different management instructions to different OS instances 130 so that each OS instance 130 gets only the management instructions relevant to its operation. Here, the policy compute engine 112 may determine which rules are relevant to a given OS instance 130 and distribute the relevant rules to that OS instance 130. A rule may be deemed relevant to a particular OS instance 130 if that OS instance 130 executes one or more workloads 135 that belongs to a group (defined by one or more labels) referenced by the rule. The policy compute engine 112 may furthermore determine which membership information is relevant to each OS instance 130 and distribute the relevant membership information to each respective OS instance 130. Here, membership information may be relevant to a particular OS instance 130 if it defines membership of a group referenced by a rule deemed relevant to the particular OS instance 130. Further details of a segmentation system for controlling communications between OS instances 130 based on labels is described in U.S. Patent Application Publication No. 2014/0373091 entitled "Distributed Network Security Using a Logical Multi-Dimensional Label-Based Policy Model," to Paul J. Kirner, et al., which is incorporated by reference herein.

The repository 114 stores information about the OS instances 130 and the workloads 135 controlled by the segmentation server 110. For example, the repository 114 may store, for each OS instance 130, an identifier (discussed in further detail below) that uniquely identifies the OS instance 130, workload identifiers for workloads 135 associated with the OS instance 135, and membership information indicating one or more groups of workloads 135 to which each workload 135 belong (e.g., as defined by the respective label sets for the workloads 135). In an embodiment, the repository 114 may comprise a directory such as an LDAP directory or a Microsoft Active Directory. Alternatively, the repository 114 may comprise a custom database.

Table 2 illustrates an example of information stored to the repository 114. Here, the "ID" represents the identifier for each OS instance 130. The workload ID(s) represent the workload identifier for the workload(s) 135 executing on each OS instance 130. If only a single workload executes on a particular OS instance 130, the workload ID may be synonymous with the OS instance ID (e.g., in the case of ID1 and IDn). If more than one workload 135 executes on a given OS instance 130, the workload ID may include the OS instance ID in combination with a sub-identifier for the workload 135 (e.g., in the case of ID2). The sub-identifier may comprise, for example, a port number, IP address, process name, or other identifier that uniquely identifies the workload 135 when taken in combination with the identifier for the OS instance 130. The memberships represent groups to which one or more workloads 135 executing on the OS instance 130 belongs. Each group may correspond to a unique label set (e.g., a different combination of labels) involving one or more dimensions. For example, group A may represent a group of workloads 135 having the label set (role: web; location: Europe).

TABLE 2

Example of a Repository Table

| OS Instance ID | Workload ID(s) | Memberships |
|---|---|---|
| ID1 | ID1 | A, C, D |
| ID2 | ID2 + subID1<br>ID2 + subID2 | B, C<br>D |
| . | . | . |
| . | . | . |
| . | . | . |
| IDn | IDn | B, D, E, F |

As will be described in further detail below, the OS instance identifiers used to reference the workloads 135 when defining the membership information are identifiers that can be cryptographically proven during communications. Unlike IP addresses, these identifiers are difficult or impossible to spoof and do not typically change, thus enabling enforcement of the segmentation policy with improved security relative to systems that rely only on IP address to identify the workloads 135.

The certificate authority 140 comprises a server that issues certificates to the OS instances 130 as will be described in further detail below. For example, the certificate authority 140 may receive identifying information from a particular OS instance 130, verify the identifying information, and generate the certificate for the particular OS instance 130. The identity associated with the certificate may be a machine identity identifying the OS instance 130, a user identity identifying a user logged into the OS instance, or a combination thereof. The certificate authority 140 may furthermore digitally sign the certificate 140 to enable other entities to verify that the certificate 134 was issued by the certificate authority 140. The certificate authority 140 may be managed by a trusted third party.

The administrative client 150 comprises a computing device that may be operated by an administrator of an enterprise being managed by the segmentation server 110. The administrative client 150 may execute an interface (e.g., via an application or web browser) that enables the administrator to configure the segmentation policy. The interface may furthermore enable the administrator to obtain various information about the OS instances 130 and workloads 135 on the network 120, or other information relevant to managing the OS instances 130 and workloads 135 on the network 120.

The network 120 represents the communication pathway between the segmentation server 110, the OS instances 130, the certificate authority 140, and the administrative client 150. The network 120 may use standard communications technologies and/or protocols and can include the Internet and/or one or more local enterprise networks. In another embodiment, the network 120 can use custom and/or dedicated data communications technologies.

Figure 2:
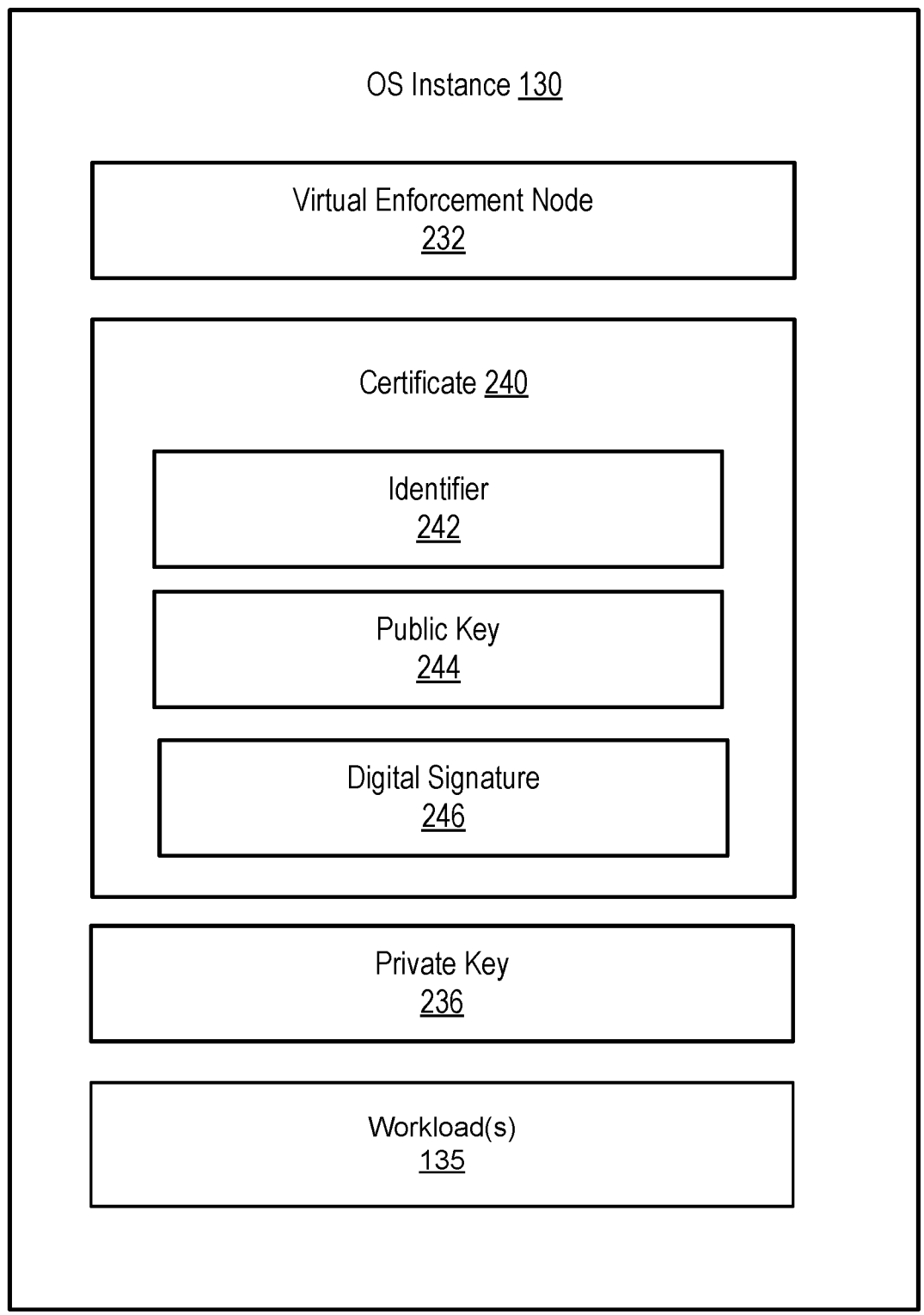
FIG. 2 is a block diagram illustrating an embodiment of an operating system instance operating in the computing environment.

FIG. 2 illustrates an example embodiment of an OS instance 130. In an embodiment, each OS instance 130 includes a virtual enforcement node 232, a certificate 240, and a private key 236. Furthermore, each OS instance 130 may execute one or more workloads 135. Other conventional components of the OS instances 130 and the physical or virtual machines on which they execute such as other operating system components, executable applications, and interfaces are omitted for clarity of description. In alternative embodiments, the OS instances 130 may include different or additional components. The virtual enforcement node 232 and other components of the OS instances 130 may be implemented as a non-transitory computer-readable storage medium storing instructions executable by a processor that when executed causes the processor to perform the steps attributed to the virtual enforcement node 232 described herein.

The certificate 240 comprises a digital document issued to the OS instance 130 by the certificate authority 140. The certificate 240 may comprise, for example, an X.509 certificate or another certificate from a trusted source. The certificate 240 includes an identifier 242, a public key 244, and a digital signature 246. The certificate 240 may furthermore include additional information that may be typically found in an X.509 certificate. The identifier 242 uniquely identifies the OS instance 130 to which the certificate was issued or a user logged into the OS instance 130. For example, the identifier 242 may correspond to a "Distinguished Name" (DN) field of an X.509 certificate. The public key 244 comprises a cryptographic key that forms a cryptographic key pair together with the private key 236. The digital signature 246 includes cryptographically strong values attesting to the validity of the certificate 240. The digital signature 246 can be validated to prove the authenticity of the certificate as being issued from the certificate authority 140. The certificate 240 is issued by the certificate authority 140 upon the certificate authority 140 verifying the identity of the OS instance 130 and its ownership of the public key 244. Thus, the certificate 240 may serve to bind the identifier 242 to the public key 244.

An OS instance 130 may enable another OS instance 130 to authenticate its identity or the identity of a user logged into the OS instance 130 by providing the identity and a cryptographic proof of identity. The OS instances 130 may provide the identity by providing the certificate 240 which contains an identifier 242 (e.g., a machine identifier or a user identifier) representative of the identity. Alternatively, the OS instance 130 may instead provide a certificate identifier (e.g., a certificate hash) that uniquely identifies the certificate 240 without necessarily sending the certificate 240 itself. The receiving OS instance 130 may then obtain the certificate 240 based on the certificate identifier (e.g., from its own storage if it previously received the certificate or from an external certificate database). The identity proof may comprise digital data signed using a private key 236 associated with the OS instance 130 or a user logged into the OS instance 130. The identity proof can be validated using the public key 244 obtained from the certificate 240. If validated, the identity proof confirms that the sending OS instance 130 owns the private key 236 matching the public key 244 and therefore, based on the validity of the certificate 240 binding the public key 244 to the identifier 242, has the identity matching the identifier 242.

In alternative embodiments, the OS instances 130 may prove their identities without necessarily using certificate-based proof. For example, a ticket-based proof of identity may be used in accordance with a protocol such as Kerberos authentication.

The virtual enforcement node 232 receives the management instructions from the segmentation server 110 and applies the management instructions to enforce the segmentation policy. The virtual enforcement node 232 applies the management instructions by configuring enforcement mechanisms in the operating system instance 130. In an embodiment, the virtual enforcement node 232 may program a kernel firewall (e.g., using iptables or Windows Filtering Platform (WFP)) to implement the management instructions. Here, the virtual enforcement node 232 may program the enforcement mechanism to permit communications allowed by the management instructions and block other communications. In an example scenario, if a first workload 135-1 executing on a first OS instance 130-1 attempts to access a service provided by a second workload 135-2 executing on a second OS instance 130-2, the enforcement mechanism on the first OS instance 130-1 (programmed according to the management instructions and membership information), determines whether the first workload 135-1 is permitted to receive the service from the second workload 135-2. Similarly, the enforcement mechanism on the second OS instance 130-2 (programmed according to the management instructions and membership information), determines whether the second workload 135-2 is permitted to provide the service to the first workload 135-1. The OS instances 130 may furthermore each determine and enforce any restrictions on communications relating to the service between the first and second workloads 135-1, 135-2 specified in the rules such as, for example, whether communications must be encrypted.

When a connection request is made between a pair of workloads 135, the respective virtual enforcement nodes 132 of the respective OS instances 130 on which the workloads execute may exchange respective identities and cryptographic proof of the identities to enable the OS instances 130 to authenticate the received identities. Once both OS OS instances 130 authenticate the respective received identities, the OS instances 130 each determine, based on the authenticated identities, if the connection is permitted based on their respective management instructions. If the connection is permitted, the OS instances 130 determine session parameters such as session keys, session identifiers, and data path algorithms for use during the connected session. Each message sent during the session may include the session identifier for the sending OS instance 130 and a hash of the message that can be validated using the session keys to enable the receiving OS instance 130 to verify the integrity of the message. Optionally, the session keys may also be used to encrypt the data at the sending OS instance 130 and to decrypt the data at the receiving OS instance 130. A process for facilitating a communication between workloads 135 executing on the OS instances 130 is described in further detail below with respect to FIG. 4.

Thus, the OS instances 130 perform an authentication on an identity received from a connecting OS instance 130 prior to enforcing the segmentation policy and continue to confirm the identity in each message communicated during a permitted connection. This technique enhances security and reduces administrative overhead relative to segmentation techniques that rely on IP address alone because IP addresses can be spoofed by malicious actors and because the IP address of the OS instance 130 may change for legitimate reasons. By instead relying on a cryptographic proof of identity, full data path integrity can be ensured.

Figure 3:
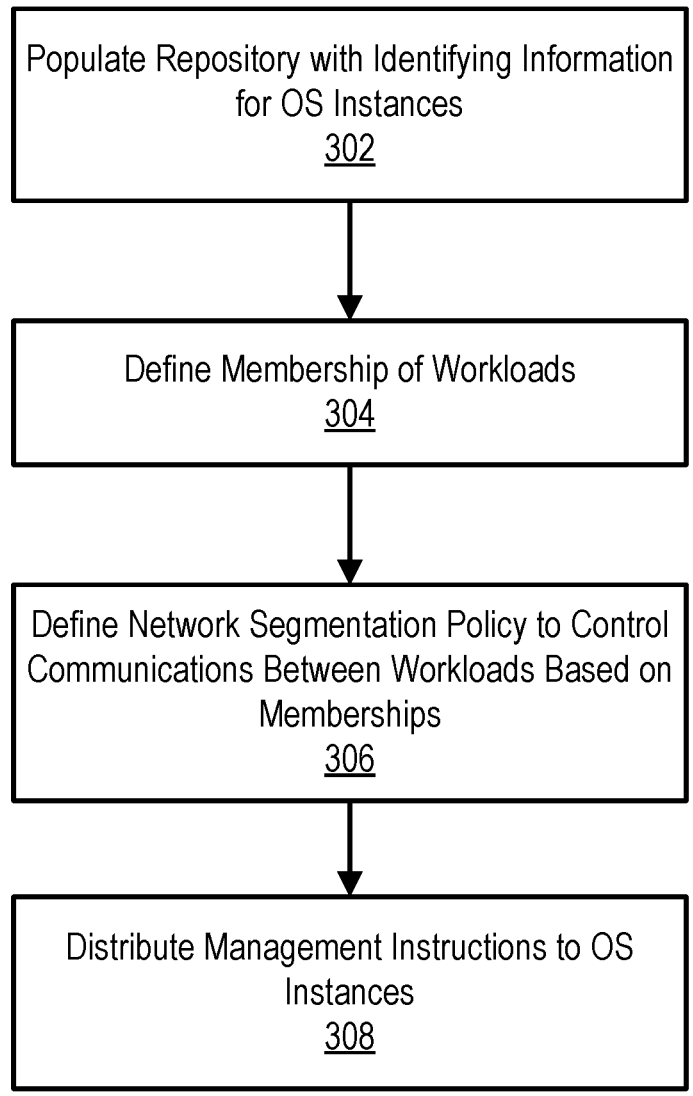
FIG. 3 is a flowchart illustrating an embodiment of a process for generating and distributing management instructions to operating system instances on a network.

FIG. 3 illustrates an embodiment of a process for implementing a segmentation policy. The policy compute engine 112 populates 302 the repository 114 with identifying information for the OS instances 130 and the workloads 135. The OS instances 130 may be discovered by the policy compute engine 112 through an active discovery process, or the OS instances 130 may be configured to report appropriate information to the policy compute engine 112 when they come online or when a change in state occurs. The identifying information may include, for example, the identifier 242 provided in the certificate 240 issued by the certificate authority 140 and identifying information for workloads 135 executing on the OS instances 130.

The policy compute engine 112 furthermore defines 304 memberships of the workloads 135 executing on the OS instances 130 in the repository 114. For example, each workload 135 may be assigned membership in one or more groups of workloads 135. A group may correspond to a unique label set comprising a set of labels, where each workload 135 in the group have the set of labels. In one embodiment, the OS instances 130 store label sets for their respective workloads 135 and report the label sets to the policy compute engine 112. In another embodiment, the policy compute engine 112 may determine the labels and store appropriate memberships to the repository 114. The labels may furthermore be assigned at least in part based on information provided via the administrative client 150.

The policy compute engine 112 defines 306 a segmentation policy for controlling communications between the workloads 135 based on the defined memberships. For example, the segmentation policy may comprise a set of rules that each specify whether a first set of one or more groups of workloads 135 are allowed to provide a particular service to a second set of one or more groups of workloads 135. The rules may further place restrictions on how the workloads 135 are allowed to communicate while facilitating the service.

The policy compute engine 112 distributes 308 management instructions to the OS instances 130 to enable the OS instances 130 to enforce the segmentation policy. Here, the policy compute engine 112 may determine which rules are relevant to each OS instance 130 and distribute the relevant rules to that OS instance 130. The policy compute engine 112 may furthermore determine which membership information is relevant to each OS instance 130 and distribute the relevant membership information to each respective OS instance 130. The membership information may specify for each group, the workload identifiers of workloads 135 that are members of the group.

Figure 4:
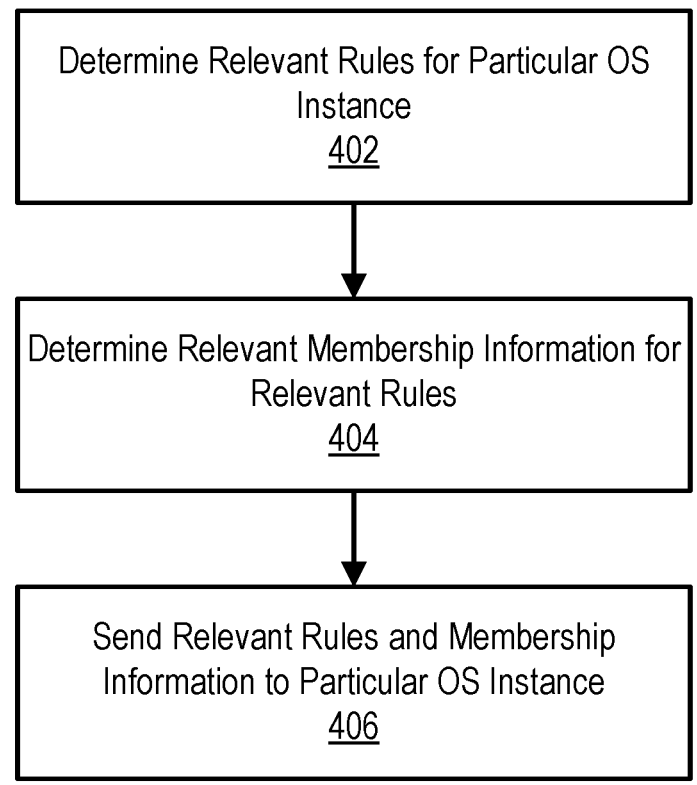
FIG. 4 is a flowchart illustrating an embodiment of a process for determining management instructions relevant to a particular operating system instance.

FIG. 4 illustrates an embodiment of a process for distributing the management instructions to the OS instances 130. As explained previously, the policy compute engine 112 may identify management instructions for each individual OS instance 130 and distribute different management instructions to different OS instances 130. The policy compute engine 112 determines 402 relevant rules that are relevant to a particular OS instance 130. For example, the policy compute engine 112 determine what groups the workload(s) 135 associated with each OS instance 130 has membership in, and then identifies any rules that control communications between any of the member groups as relevant rules. The policy compute engine 112 determines 404 relevant membership information based on the relevant rules. For example, the policy compute engine 112 may identify each of the groups of workloads 135 named in the relevant rules, and determine the membership (e.g., workload identifiers) for each of the groups as the relevant membership information for the particular OS instance 130. The relevant rules and the relevant membership information are then sent to the particular OS instance 306. The process of FIG. 4 may be applied to each OS instance 130 on the network 120.

In an embodiment, instead of directly sending the relevant rules to the OS instances 130, the policy compute engine 112 may instead break each relevant rule into a set of function-level instructions, and send the function-level instructions to the OS instance 130. Here, while a single rule may place controls on multiple groups of workloads 135 as providers of a service (each represented by a different label set) and multiple groups of workloads 135 as consumers of the service (each represented by a different label set), the function-level instructions each apply to only a single group of workloads 135 (represented by a single label set) as a provider of the service and a single group of workloads 135 as consumers of the service. In this embodiment, the policy compute engine 112 sends the function-level instructions derived from the relevant rules to the OS instances 130.

Figure 5:
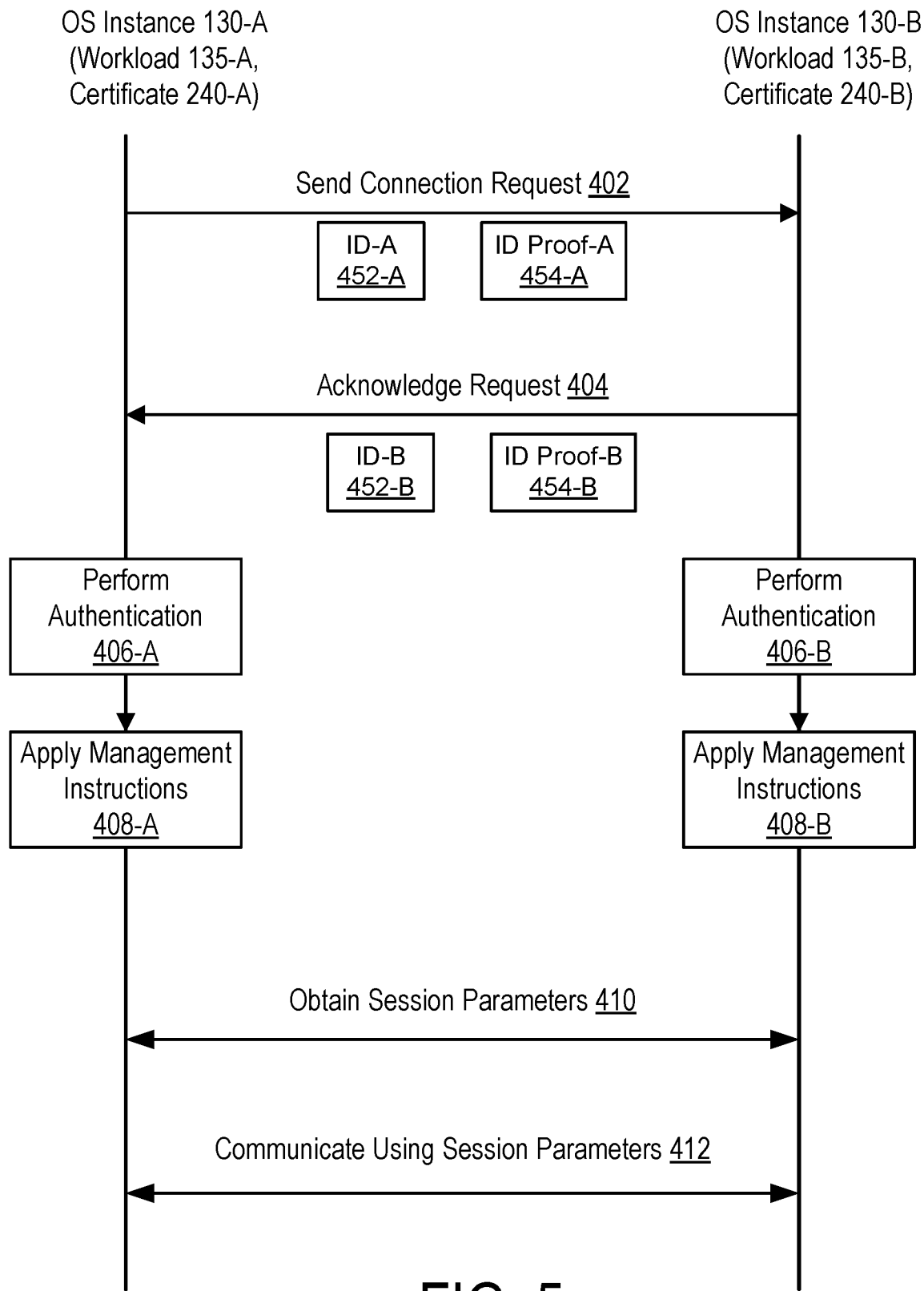
FIG. 5 is a flowchart illustrating an embodiment of a process for communicating between workloads in a segmented network.

FIG. 5 illustrates an embodiment of a process performed by OS instances 130 to enforce the segmentation policy. A connection request is sent from a first workload 135-A executing on a first OS instance 130-A to a second workload 135-B executing on a second OS instance 130-B. The request may, for example, request that the second workload 135-B provide a service to the first workload 135-A. As part of the request, the first OS instance 130-A sends 402 an identity 452-A (e.g., an identifier of the OS instance 130-A or a user logged into the OS instance 130-A) and a cryptographic proof of the identity 454-A to the second OS instance 130-B. The first OS instance 130-A may send the identity 452-A by sending a certificate 240-A directly or by sending a certificate hash identifying the certificate 240-A that enables the OS instance 130-B to obtain the certificate 240-A, without necessarily sending the certificate 240-A itself. The proof of the identity 454-A may comprise data (e.g., a token) digitally signed using the private key 236-A corresponding to the public key 244-A. Alternatively, the proof of identity 454-A may be a ticket-based proof of identity using a protocol such as Kerberos.

The second OS instance 130-B receives the connection request 402 and sends an acknowledgement 404 of the request. The acknowledgement may include an identity 452-B (e.g., a machine identifier for the second OS instance 130-B or a user identifier for a user logged into the second OS instance 130-B) and proof of identity 454-B.

The first OS instance 130-A performs 406-A an authentication process to authenticate the identity 452-B received from the second OS instance 130-B based on the certificate 240-B and the proof of identity 454-A received from the second OS instance 130-B. For example, if the first OS instance 130-A does not receive the certificate 240-B directly from the second OS instance 130-B, the first OS instance 130-A obtains the certificate 240-B (e.g., from its own storage or from an external certificate database) based on a certificate hash identifying the certificate 240-B. The first OS instance 130-A verifies that the certificate 240-B is authentic by verifying the digital signature 246-B using a public key associated with the certificate authority 140. The first OS instance 130-A furthermore uses the public key 244-B from the certificate 240-B associated with the second OS instance 130-B to verify the proof of identity 454-B received from the second OS instance 130-B. Specifically, the first OS instance 130-A verifies that the proof of identity 454-B was digitally signed using the private key 236-B corresponding to the public key 244-B. Similarly, the second OS instance 130-B performs 406-B an authentication to authenticate the identity 452-A received from the first OS instance 130-A based on the certificate 240-A and the proof of identity 454-A received from the first OS instance 130-A in the same manner described above. In an embodiment, an internet key exchange (IKE) protocol is applied by each OS instance 130-A, 130-B to perform the authentication. If either authentication fails, the connection may be terminated.

In alternative embodiments, the OS instances 130 may perform 406 authentication using a ticket-based authentication protocol without necessarily using certificates 240.

Otherwise, if the authentication passes, the OS instances 130-A, 130-B each determine 408-A, 408-B using their respective enforcement mechanisms programmed based on their respective management instructions, if the communication is permitted between the first workload 135-A and the second workload 135-B under the segmentation policy.

If either OS instance 130-A, 130-B determines that the communication is not permitted based on their respective the management instructions, then the connection may be terminated. Otherwise, if the management instructions permit the connection, the OS-instances 130-A, 130-B obtain 410 session parameters for use during the connection. For example, the OS instances 130-A, 130-B derive session keys, generate respective session identifiers, and negotiate data path algorithms. In an embodiment, the session keys may be derived in part from the respective identifiers 242 of the OS instances 130, the respective public keys 244, the respective private keys 236, or other information associated with the OS instances 130. The OS instances 130-A, 130-B may then communicate 412 using the session keys, session identifiers, and data path algorithms. In these communications, each message includes the session identifier for the sending OS instance 130 and a hash value computed in accordance with the data path algorithms from the message data using the session keys. The receiving OS instance 130 can validate the integrity of the message by validating the hash value using the session keys. The messages may furthermore be optionally encrypted in accordance with the data path algorithms by the transmitting OS instance 130 and decrypted by the receiving OS instance 130 using the session keys to ensure privacy of the messages. In an embodiment, the session keys, session identifiers, and data path algorithms may be determined in accordance with the IPSec protocol. In an embodiment, the relevant rule permitting the communication may dictate whether unencrypted communication is permissible or if only encrypted communication is permitted.

In an embodiment, the policy compute engine 112 may send updated management instructions or membership information to the OS instances 130 when the segmentation policy is updated or when the state of the workloads 130 change. In some cases, updated management instructions may indicate that an active connection between two OS instances 130 is no longer permissible under the updated segmentation policy. In this case, the connection may be immediately terminated in accordance with the updated segmentation policy.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for enforcing an access control policy comprising:

sending, by a first operating system instance executing on a first computing device, a connection request from a first workload executing on the first operating system instance to a second workload executing on a second operating system instance on a second computing device;

providing, by the first operating system instance to the second operating system instance, a first identity and a first cryptographic proof of the first identity;

receiving, from the second operating system instance at the first operating system instance, a second identity and a second cryptographic proof of the second identity;

authenticating, by the first operating system instance, the second identity received from the second operating system instance based on the second cryptographic proof of the second identity, wherein authenticating the second identity of the second operating system instance comprises:
  obtaining a digital certificate associated with the second identity, the digital certificate including an identifier for the second identity, a public key associated with the second identity, and a digital signature;
  verifying the digital signature to validate authenticity of the digital certificate; and
  verifying the second cryptographic proof of the second identity using the public key associated with the second identity in the digital certificate;
responsive to authenticating the second identity received from the second operating system instance, determining, based on the second identity, if the second workload executing on the second operating system instance is permitted to communicate with the first workload according to management instructions stored by the first operating system instance;
responsive to determining that the second workload is permitted to communicate with the first workload, establishing an authenticated connection between the first workload and the second workload; and
facilitating communication between the first workload and the second workload over the authenticated connection.

2. The method of claim 1, further comprising:
receiving, by the first operating system instance, one or more rules permitting communication between the first workload and one or more groups of workloads;
receiving membership information by the first operating system instance identifying workloads in the one or more groups; and
programming an enforcement mechanism of the first operating system instance to enable the first workload to communicate with each of the identified workloads in the one or more groups in accordance with the one or more rules.

3. The method of claim 2, wherein the one or more rules identify the one or more groups of workloads by labels each describing a high-level characteristic of the workloads in each group.

4. The method of claim 1, wherein facilitating communication between the first workload and the second workload comprises:
encrypting messages for transmitting to the second workload; and
decrypting messages received from the second workload.

5. The method of claim 1, wherein the first identity comprises a machine identity for the first operating system instance.

6. The method of claim 1, wherein the first identity comprises a user identity for a user logged into the first operating system instance.

7. A non-transitory computer-readable storage medium storing instructions for enforcing an access control policy, the instructions when executed by one or more processors causing the one or more processors to perform steps comprising:
sending, by a first operating system instance executing on a first computing device, a connection request from a first workload executing on the first operating system instance to a second workload executing on a second operating system instance on a second computing device;
providing, by the first operating system instance to the second operating system instance, a first identity and a first cryptographic proof of the first identity;
receiving, from the second operating system instance at the first operating system instance, a second identity and a second cryptographic proof of the second identity;
authenticating, by the first operating system instance, the second identity received from the second operating system instance based on the second cryptographic proof of the second identity, wherein authenticating the second identity of the second operating system instance comprises:
  obtaining a digital certificate associated with the second identity, the digital certificate including an identifier for the second identity, a public key associated with the second identity, and a digital signature;
  verifying the digital signature to validate authenticity of the digital certificate; and
  verifying the second cryptographic proof of the second identity using the public key associated with the second identity in the digital certificate;
responsive to authenticating the second identity received from the second operating system instance, determining, based on the second identity, if the second workload executing on the second operating system instance is permitted to communicate with the first workload according to management instructions stored by the first operating system instance;
responsive to determining that the second workload is permitted to communicate with the first workload, establishing an authenticated connection between the first workload and the second workload; and
facilitating communication between the first workload and the second workload over the authenticated connection.

8. The non-transitory computer-readable storage medium of claim 7, the steps further comprising:
receiving, by the first operating system instance, one or more rules permitting communication between the first workload and one or more groups of workloads;
receiving membership information by the first operating system instance identifying workloads in the one or more groups; and
programming an enforcement mechanism of the first operating system instance to enable the first workload to communicate with each of the identified workloads in the one or more groups in accordance with the one or more rules.

9. The non-transitory computer-readable storage medium of claim 8, wherein the one or more rules identify the one or more groups of workloads by labels each describing a high-level characteristic of the workloads in each group.

10. The non-transitory computer-readable storage medium of claim 7, wherein the first identity comprises a machine identity for the first operating system instance.

11. The non-transitory computer-readable storage medium of claim 7, wherein the first identity comprises a user identity for a user logged into the first operating system instance.

12. The non-transitory computer-readable storage medium of claim 7, wherein facilitating communication between the first workload and the second workload comprises:

encrypting messages for transmitting to the second workload; and decrypting messages received from the second workload.

13. A computing device comprising:
one or more processors; and
a non-transitory computer-readable storage medium storing instructions for enforcing an access control policy, the instructions when executed by the one or more processor causing the one or more processors to perform steps comprising:
  sending, by a first operating system instance executing on a first computing device, a connection request from a first workload executing on the first operating system instance to a second workload executing on a second operating system instance on a second computing device;
  providing, by the first operating system instance to the second operating system instance, a first identity and a first cryptographic proof of the first identity;
  receiving, from the second operating system instance at the first operating system instance, a second identity and a second cryptographic proof of the second identity;
  authenticating, by the first operating system instance, the second identity received from the second operating system instance based on the second cryptographic proof of the second identity, wherein authenticating the second identity of the second operating system instance comprises:
    obtaining a digital certificate associated with the second identity, the digital certificate including an identifier for the second identity, a public key associated with the second identity, and a digital signature;
    verifying the digital signature to validate authenticity of the digital certificate; and
    verifying the second cryptographic proof of the second identity using the public key associated with the second identity in the digital certificate;
  responsive to authenticating the second identity received from the second operating system instance, determining, based on the second identity, if the second workload executing on the second operating system instance is permitted to communicate with the first workload according to management instructions stored by the first operating system instance;
  responsive to determining that the second workload is permitted to communicate with the first workload, establishing an authenticated connection between the first workload and the second workload; and
  facilitating communication between the first workload and the second workload over the authenticated connection.

14. The computing device of claim 13, the steps further comprising:
  receiving, by the first operating system instance, one or more rules permitting communication between the first workload and one or more groups of workloads; receiving membership information by the first operating system instance identifying
  workloads in the one or more groups; and
  programming an enforcement mechanism of the first operating system instance to enable the first workload to communicate with each of the identified workloads in the one or more groups in accordance with the one or more rules.

15. The computing device of claim 14, wherein the one or more rules identify the one or more groups of workloads by labels each describing a high-level characteristic of the workloads in each group.

16. The computing device of claim 13, wherein facilitating communication between the first workload and the second workload comprises:
  encrypting messages for transmitting to the second workload; and
  decrypting messages received from the second workload.

17. The computing device of claim 13, wherein the first identity comprises a machine identity for the first operating system instance.

* * * * *